(12) United States Patent
Hiller

(10) Patent No.: US 11,177,548 B1
(45) Date of Patent: Nov. 16, 2021

(54) ELECTROMAGNETIC WAVE CONCENTRATION

(71) Applicant: THE BOEING COMPANY, Chicago, IL (US)

(72) Inventor: Nathan D. Hiller, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 18 days.

(21) Appl. No.: 16/865,830

(22) Filed: May 4, 2020

(51) Int. Cl.
 *H01P 5/19* (2006.01)
 *G02B 6/293* (2006.01)
 *H01P 3/06* (2006.01)

(52) U.S. Cl.
 CPC .............. *H01P 5/19* (2013.01); *G02B 6/29301* (2013.01); *H01P 3/06* (2013.01)

(58) Field of Classification Search
 CPC .......... H01P 5/19; H01P 3/06; G02B 6/29301
 USPC ........................................................ 333/137
 See application file for complete search history.

(56) References Cited

U.S. PATENT DOCUMENTS

| | | |
|---|---|---|
| 2,677,766 A | 5/1954 | Litchford |
| 3,404,405 A | 10/1968 | Young |
| 3,665,480 A | 5/1972 | Fassett |
| 3,696,433 A | 10/1972 | Killion et al. |
| 3,729,740 A | 4/1973 | Nakahara et al. |
| 4,197,545 A | 4/1980 | Favaloro et al. |
| 4,232,321 A | 11/1980 | Ohm |
| 4,313,120 A | 1/1982 | Westerman |

(Continued)

FOREIGN PATENT DOCUMENTS

| | | |
|---|---|---|
| EP | 1738432 A4 | 9/2007 |
| EP | 2573872 A1 | 3/2013 |

(Continued)

OTHER PUBLICATIONS

Righini et al., "Glass Optical Waveguides: A Review of Fabrication Techniques", Optical Engineering 53(7), 071819 (Jul. 2014), https://www.spiedigitallibrary.org/journals/Optical-Engineering, printed on Jan. 20, 2020, 15 pgs.

(Continued)

*Primary Examiner* — Robert J Pascal
*Assistant Examiner* — Kimberly E Glenn
(74) *Attorney, Agent, or Firm* — Moore Intellectual Property Law, PLLC

(57) ABSTRACT

A device for concentrating an electromagnetic wave includes a waveguide array that includes a central waveguide having a first refractive index and a central axis and feeder waveguides disposed around the central waveguide. Each feeder waveguide has a second refractive index. The waveguide array also includes a support structure coupled to the waveguide arrays and configured to, in a deployed configuration, retain the feeder waveguides of the waveguide array in a substantially symmetric arrangement with respect to the central waveguide to enable concentration of an electromagnetic wave of a particular wavelength in the central waveguide via electromagnetic coupling of the central waveguide with each of the feeder waveguides, with the respective axis of each feeder waveguide oriented substantially parallel to the central axis of the central waveguide and with each feeder waveguide spaced apart from the central waveguide by a distance that is based on the particular wavelength.

20 Claims, 9 Drawing Sheets

(56) References Cited

U.S. PATENT DOCUMENTS

| | | |
|---|---|---|
| 4,862,185 A | 8/1989 | Andrews et al. |
| 5,043,738 A | 8/1991 | Shapiro et al. |
| 5,218,322 A | 6/1993 | Allison et al. |
| 5,353,035 A | 10/1994 | Cuervo-Arango et al. |
| 5,421,848 A | 6/1995 | Maier et al. |
| 5,473,336 A | 12/1995 | Harman et al. |
| 5,581,267 A | 12/1996 | Matsui et al. |
| 5,726,666 A | 3/1998 | Hoover et al. |
| 5,914,693 A | 6/1999 | Takei et al. |
| 5,977,924 A | 11/1999 | Takei et al. |
| 5,982,256 A | 11/1999 | Uchimura et al. |
| 6,005,520 A | 12/1999 | Nalbandian et al. |
| 6,052,087 A | 4/2000 | Ishikawa et al. |
| 6,198,453 B1 | 3/2001 | Chew |
| 6,252,549 B1 | 6/2001 | Derneryd |
| 6,285,325 B1 | 9/2001 | Nalbandian et al. |
| 6,424,318 B1 | 7/2002 | Bergstedt et al. |
| 6,664,931 B1 | 12/2003 | Nguyen et al. |
| 7,224,944 B2 | 5/2007 | McEwan |
| 7,385,462 B1 | 6/2008 | Epp et al. |
| 7,471,258 B2 | 12/2008 | Hsu et al. |
| 7,570,221 B2 | 8/2009 | May et al. |
| 7,994,996 B2 | 8/2011 | Rebeiz et al. |
| 8,018,384 B2 | 9/2011 | Floyd et al. |
| 8,197,473 B2 | 6/2012 | Rossetto et al. |
| 8,860,532 B2 | 10/2014 | Gong et al. |
| 9,437,184 B1 | 9/2016 | Swett |
| 9,531,078 B2 | 12/2016 | Taptic et al. |
| 9,590,300 B2 | 3/2017 | Artemenko et al. |
| 9,766,330 B2 | 9/2017 | Nagaishi et al. |
| 9,831,562 B2 | 11/2017 | Caratelli et al. |
| 9,865,935 B2 | 1/2018 | Miraftab et al. |
| 9,979,459 B2 | 5/2018 | Savage et al. |
| 10,116,051 B2 | 10/2018 | Scarborough et al. |
| 10,224,638 B2 | 3/2019 | Artemenko et al. |
| 10,283,832 B1 | 5/2019 | Chayat et al. |
| 10,291,312 B2 | 5/2019 | Savage et al. |
| 10,312,601 B2 | 6/2019 | Zhai et al. |
| 10,522,916 B2 | 12/2019 | Rogers et al. |
| 10,553,945 B2 | 2/2020 | Yong et al. |
| 10,777,905 B2 | 9/2020 | Diehl et al. |
| 10,833,415 B2 | 11/2020 | Rogers |
| 2003/0006941 A1 | 1/2003 | Ebling et al. |
| 2003/0043086 A1 | 3/2003 | Schaffner et al. |
| 2006/0098272 A1 | 5/2006 | Lerner et al. |
| 2007/0216596 A1 | 9/2007 | Lewis et al. |
| 2013/0258490 A1 | 10/2013 | Ishihara |
| 2016/0056541 A1 | 2/2016 | Tageman et al. |
| 2016/0126637 A1 | 5/2016 | Uemichi |
| 2016/0322703 A1 | 11/2016 | Jesme et al. |
| 2017/0084971 A1 | 3/2017 | Kildal et al. |
| 2017/0133756 A1 | 5/2017 | Eastburg et al. |
| 2017/0324171 A1 | 11/2017 | Shehan |
| 2017/0352944 A1 | 12/2017 | Komulainen et al. |
| 2019/0067805 A1 | 2/2019 | Rogers et al. |
| 2019/0086581 A1 | 3/2019 | Diehl et al. |
| 2019/0237844 A1 | 8/2019 | Rogers et al. |
| 2019/0237876 A1 | 8/2019 | Rogers et al. |
| 2019/0312326 A1 | 10/2019 | Rogers et al. |
| 2020/0067165 A1 | 2/2020 | Rogers |
| 2020/0067201 A1 | 2/2020 | Rogers |
| 2020/0328521 A1 | 10/2020 | Rogers |

FOREIGN PATENT DOCUMENTS

| | | |
|---|---|---|
| EP | 2750246 A1 | 7/2014 |
| EP | 3012916 A1 | 4/2016 |
| JP | H08125404 A | 5/1996 |
| WO | 2005094352 A3 | 2/2007 |
| WO | 20150102938 | 7/2015 |
| WO | 2019032047 A1 | 2/2019 |

OTHER PUBLICATIONS

Abu Tarboush, H. F. et al., "Bandwidth Enhancement for Microstrip Patch Antenna Using Stacked Patch and Slot", 2009 IEEE International Workshop on Antenna Technology, Mar. 2-4, 2009, 4 pgs.

Allen, J. W., et al., "Design and fabrication of an RF GRIN lens 3D printing technology", Proc. of SPIE, vol. 8624, Feb. 20, 2013, 8 pgs.

Ambresh P. A., et al., "Effect of Slots on Microstrip Patch Antenna Characteristics", International Conference on Computer, Communication and Electrical Technology—ICCCET2011, Mar. 18 & 19, 2011, pp. 239-241.

Cheng, Yu Jian, et al., "W-band Large-Scale High-Gain Planar Integrated Antenna Array," IEEE Transactions on Antennas and Propagation, vol. 62, No. 6, Jun. 2014, pp. 3370-3373.

Cook, Benjamin S. et al. "Multilayer Inkjet Printing of Millimeter-Wave Proximity-Fed Patch Arrays on Flexible Substrates", IEEE Antennas and Wireless Propagation Letters, vol. 12, 2013, pp. 1351-1354.

Davidowitz, Marat et al., "Rigorous Analysis of a Circular Patch Antenna Excited by a Microstrip Transmission Line", IEEE Transactions on Antennas and Propagation, vol. 37, No. 8, Aug. 1989, pp. 949-958.

Delgado, Guillermo et al., "Scanning Properties of Teflon Lenses," Microwave and Optical Technology Letters, vol. 11, No. 5, Apr. 5, 1996, pp. 271-273.

Gauthier, Gildas P. et al., "A 94-GHz Aperture-Coupled Micromachined Microstrip Antenna," IEEE Transactions on Antennas and Propagation, vol. 47, No. 12, Dec. 1999, pp. 1761-1766.

Grabherr, W. et al., "Microstrip to Waveguide Transition Compatible With mm-Wave Integrated Circuits," IEEE Transactions on Microwave Theory and Techniques, vol. 42, No. 9, Sep. 1994, pp. 1842-1843.

Izuka, Hideo et al., "Millimeter-Wave Microstrip Line to Waveguide Transition Fabricated on a Single Layer Dielectric Substrate," R&D Review of Toyota CRDL, vol. 37, No. 2, Jun. 2002, pp. 13-18.

Iwasaki, H. "A circularly polarized small-size microstrip antenna with a cross slot," IEEE Transactions on Antennas and Propagation, Oct. 1996.

Jackson, D.R., Caloz, C., et al., "Leaky-wave antennas," Proceedings of the IEEE, Jul. 2012.

Jain, Sidharath, et al., "Flat-Base Broadband Multibeam Luneburg Lens for Wide Angle Scan," Cornell University, May 4, 2013, arXiv.org > physics > arXiv: 1305.0964.

Kaneda, Noriaki et al., "A Broad-band Microstrip-to-Waveguide Transition Using Quasi-Yagi Antenna," IEEE Transactions on Microwave Theory and Techniques, Dec. 1999, pp. 1-4.

Kim, D.H., Eom, H.J., "Radiation of a leaky coaxial cable with narrow traverse slots," IEEE Transactions on Antennas and Propagation, Jan. 2007, pp. 107-110.

Li, B. et al., "Study on High Gain Circular Waveguide Array Antenna with Metamaterial Structure," Progress in Electromagnetics Research (PIER), vol. 6, 2006, pp. 207-219.

Lin, Ting-Huei et al., "CPW to Waveguide Transition with Tapered Slotline Probe," IEEE Microwave and Wireless Components Letters, vol. 11, No. 7, Jul. 2001, pp. 314-316.

Menzel, W. et al. "A microstrip patch antenna with coplanar feed line," IEEE Microwave and Guided Wave Letters, Nov. 1991.

Papapolymerou, Ioannis et al., "Micromachined Patch Antennas," IEEE Transactions on Antennas and Propagation, vol. 46, No. 2, Feb. 1998, pp. 275-283.

Ponchak, George E et al., "A New Rectangular Waveguide to Coplanar Waveguide Transition," NASA Technical Memorandum 102477, IEEE MTT-S International Microwave Symposium, Dallas, TX, May 8-10, 1990, pp. 1-4.

Pozar, D.M. et al., "Increasing the Bandwidth of a Microstrip Antenna by Proximity Coupling", Electronics Letters Apr. 9, 1987 vol. 23 No. 8, pp. 368-369.

Pozar, D.M., "Microstrip Antenna Aperture Coupled to a Microstripline", Electronics Letters Jan. 17, 1985 vol. 21 No 2, pp. 49-50.

(56) References Cited

OTHER PUBLICATIONS

Pozar, David M. et al., "A Rigorous Analysis of a Microstripline Fed Patch Antenna", IEEE Transactions on Antennas and Propagation, vol. AP-35, No. 12, Dec. 1987, pp. 1343-1350.

Rida, Amin et al., "Proximity Coupled Fed Antenna Arrays on LCP for mm-Wave Applications," IEEE Antennas and Propagation Society International Symposium, Jul. 2010, 4 pgs.

Satoshi, Y., Tahara, Y., et al., "Inclined slot array antennas on a rectangular coaxial line," Proceedings of the 5th European Conference on Antennas and Propagation, 2011.

Schoenlinner, Bernhard, "Compact Wide Scan-Angle Antennas for Automotive Applications and RF MEMS Switchable Frequency-Selective Surfaces," A dissertation submitted in partial fulfillment of the requirements for the degree of Doctor of Philosophy, The University of Michigan, 2004, 72 pgs.

Schoenlinner, Bernhard, "Wide-Scan Spherical-Lens Antennas for Automotive Radars," IEEE Transactions on Microwave theory and Techniquest, vol. 50, No. 9, Sep. 2002, pp. 2166-2175.

Simon, W. et al., "A Novel Coplanar Transmission Line io Rectangular Waveguide Transition," IEEE MTT-S Digest, Jun. 1998, pp. 257-260.

Sorkherizi, Milad S. et al., "Planar High-efficiency Antenna Array Using New Printed Ridge Gap Waveguide Technology," IEEE Transactions on Antennas and Propogation, vol. 65, No. 7, Jul. 2017, pp. 3772-3776.

Targonski, S.D. et al., "Design of wideband circularly polarized aperture-coupled microstrip antennas," IEEE Transactions on Antennas and Propagation, Feb. 1993.

Tribe, J. et al., "Additively manufactured hetrogeneous substrates for three-dimensional control of permittivity," Electronics Letters, May 8, 2014, vol. 50, No. 10, pp. 745-746.

Wang, C., et al., "A novel CP patch antenna with a single feed structure," IEEE Antennas and Propagation Society International Symposium, Jul. 2000.

Wang, J., et al., "Multifunctional aperture coupled stack patch antenna," Electronics Letters, Dec. 1990.

Zhang, Guo-Hua, et al. "A Circular Waveguide Antenna Using High-Impedance Ground Plane," IEEE Antennas and Wireless Propagation Letters, vol. 2, 2003, pp. 86-88.

Zhang, S. et al., "3D-printed flat lens for microwave applications," presented at the Antennas and Propagation Conference (LAPC2015) Loughborough University, 4 pgs.

Zurcher, J.F., "The SSFIP: a global concept for high-performance broadband patch antennas," Electronics Letters, Nov. 1988.

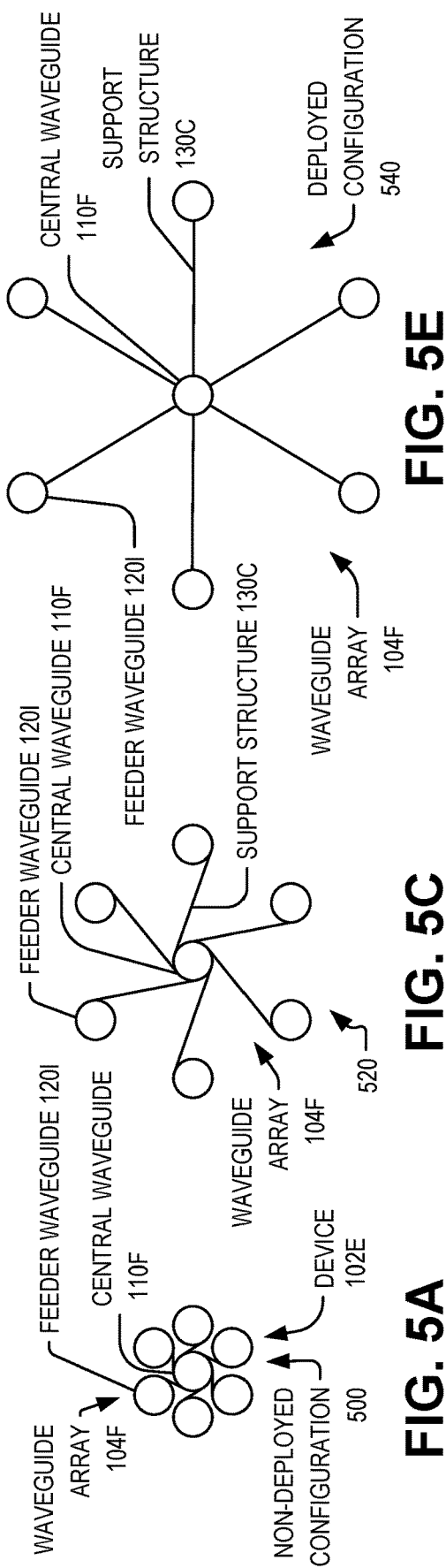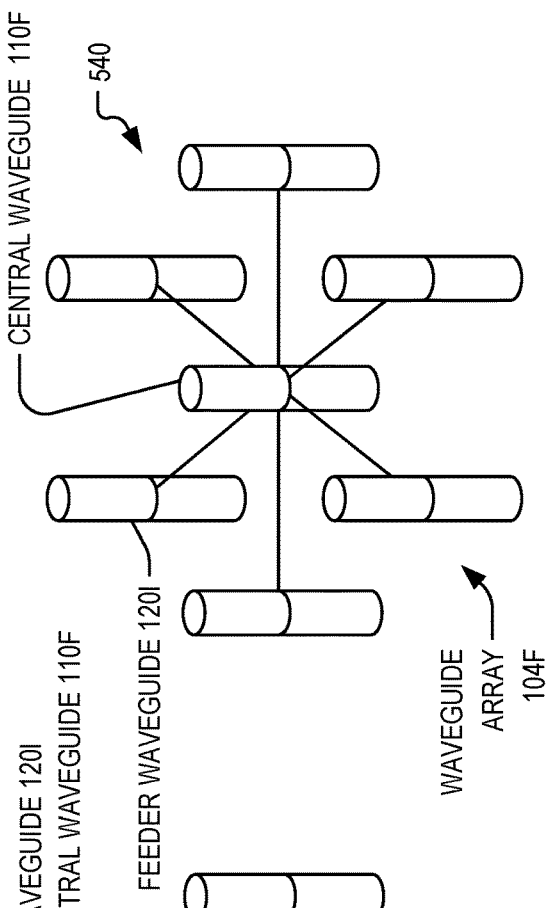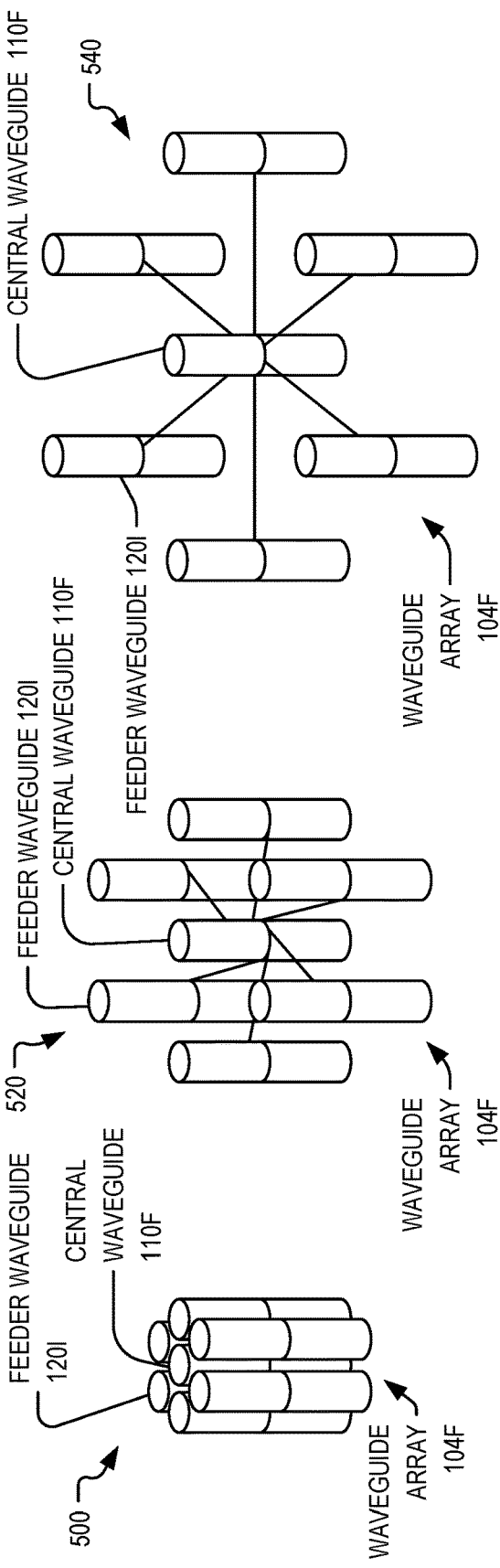
FIG. 5A FIG. 5B FIG. 5C FIG. 5D FIG. 5E FIG. 5F

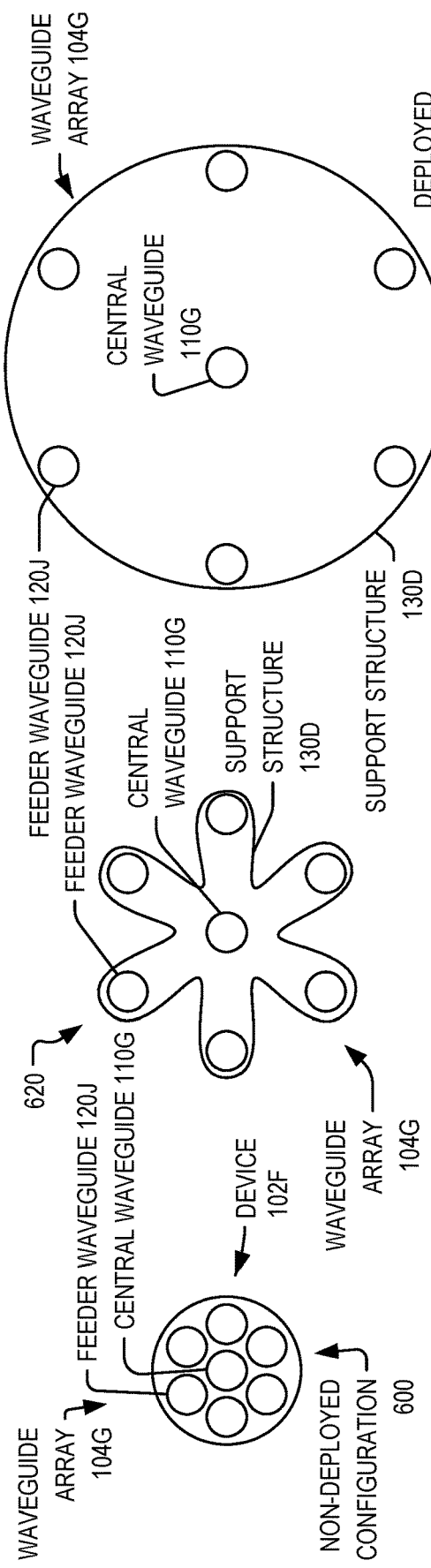
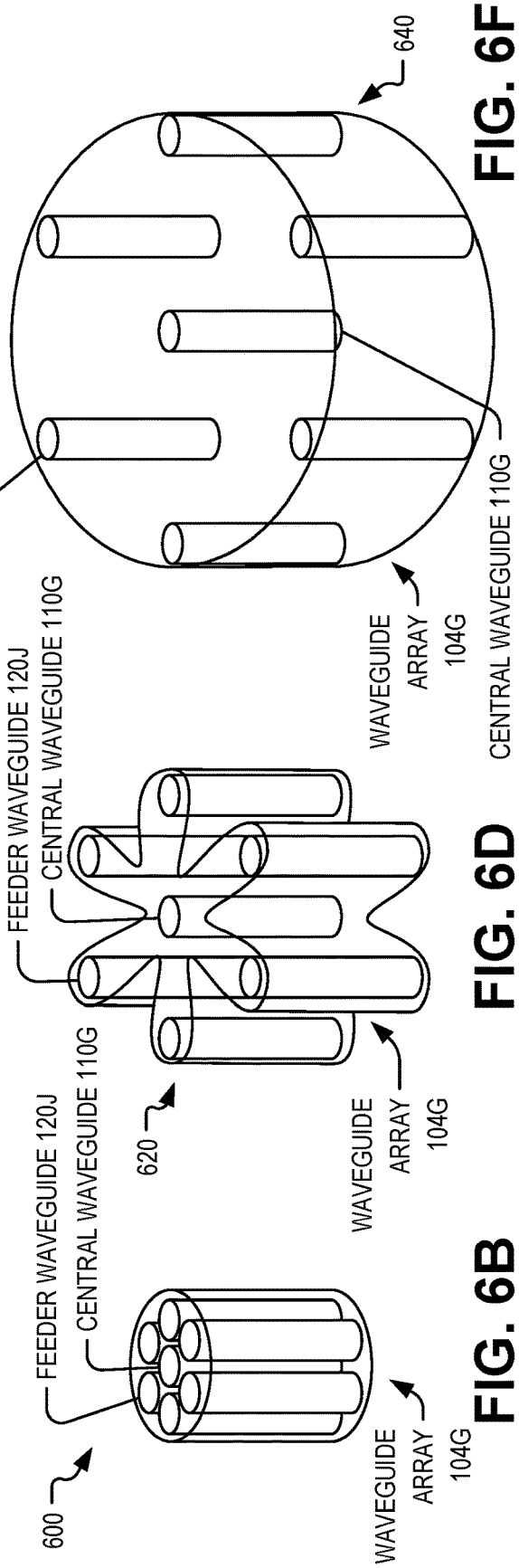
FIG. 6A
FIG. 6B
FIG. 6C
FIG. 6D
FIG. 6E
FIG. 6F

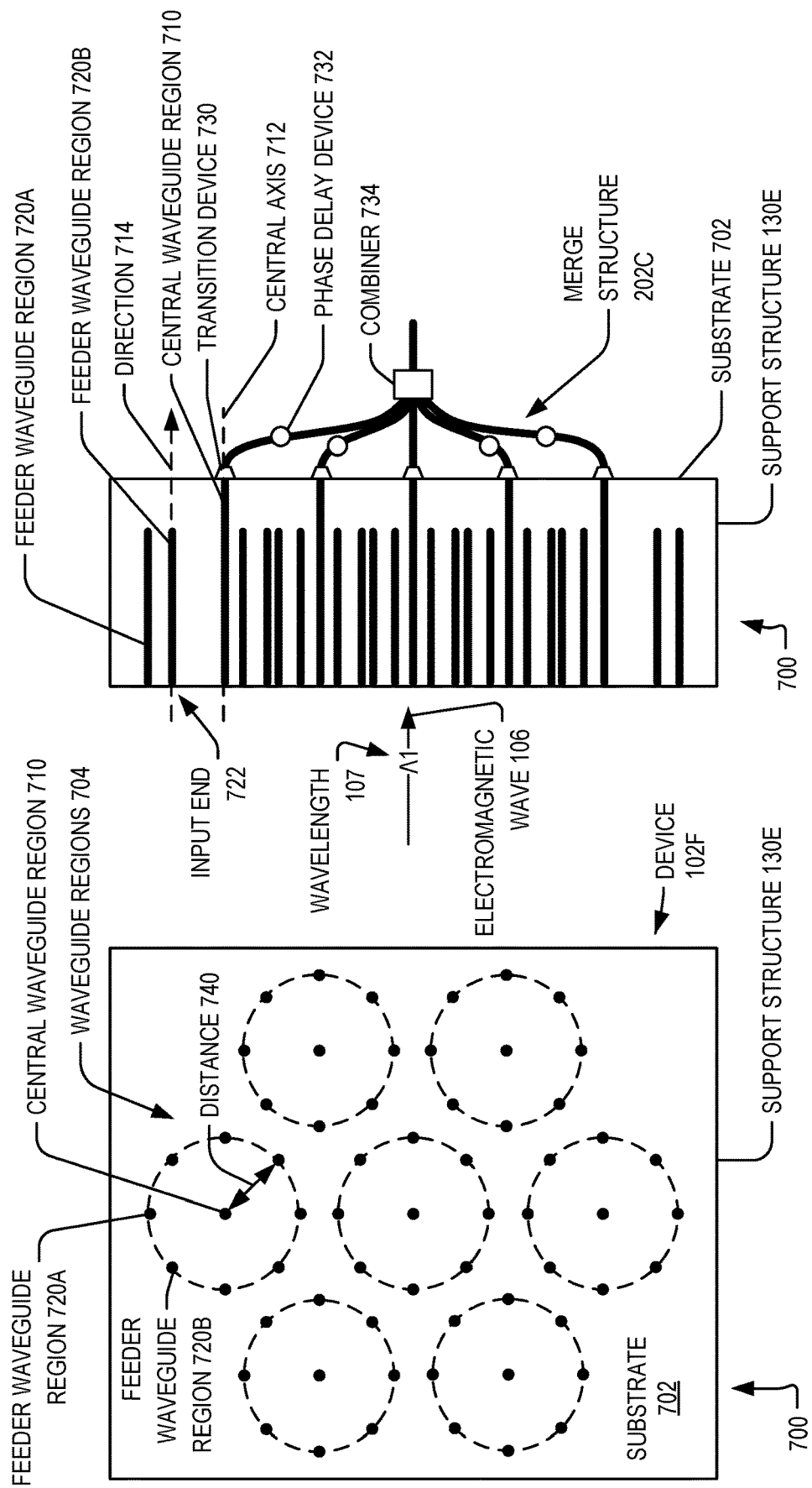

ELECTROMAGNETIC WAVE CONCENTRATION

FIELD OF THE DISCLOSURE

The present disclosure is generally related to concentrating electromagnetic waves.

BACKGROUND

Electromagnetic waves are nearly ubiquitous in modern technology. To illustrate, electromagnetic waves are used in aeronautical and military radar systems, cellular telephone systems, satellite communications, space telemetry, weather radar, and automobile anti-collision systems, as non-limiting examples. Various mechanisms are used to focus or otherwise control electromechanical waves, such as traditional lenses, Fresnel lenses, parabolic reflectors, microelectromechanical systems (MEMS), diffraction gratings, and metamaterial lenses, as illustrative examples. However, such devices can be relatively inefficient, expensive, and heavy, which limits their utility for applications such as military and satellite communication systems.

SUMMARY

In a particular implementation, a device for concentrating an electromagnetic wave includes one or more waveguide arrays. A particular waveguide array of the one or more waveguide arrays includes a central waveguide having a first refractive index and a central axis and a plurality of feeder waveguides disposed around the central waveguide. Each feeder waveguide has a second refractive index and an input end, and each feeder waveguide extends a length along a respective axis from the input end. The device includes a support structure coupled to the one or more waveguide arrays and configured to, in a deployed configuration, retain the plurality of feeder waveguides of the particular waveguide array in a substantially symmetric arrangement with respect to the central waveguide to enable concentration of an electromagnetic wave of a particular wavelength in the central waveguide via electromagnetic coupling of the central waveguide with each of the feeder waveguides, with the respective axis of each feeder waveguide oriented substantially parallel to the central axis of the central waveguide and with each feeder waveguide spaced apart from the central waveguide by a distance that is based on the particular wavelength.

In another particular implementation, a composition of matter for concentrating an electromagnetic wave includes a rigid substrate having a substrate refractive index and a plurality of waveguide regions at least partially embedded within the rigid substrate. A first set of the plurality of waveguide regions includes a central waveguide region having a first refractive index and a central axis and a plurality of feeder waveguide regions in a substantially symmetric arrangement with respect to the central waveguide region. Each feeder waveguide region has a second refractive index and extends in a direction parallel to the central axis from an input end, and each feeder waveguide region is spaced apart from the central waveguide region by a distance that is based on a wavelength of the electromagnetic wave. The substrate refractive index is less than the first refractive index and is less than the second refractive index.

In another particular implementation, a method includes receiving an electromagnetic wave at an input of a waveguide array. The waveguide array includes a central waveguide having a first refractive index and a central axis and a plurality of feeder waveguides in a substantially symmetric arrangement with respect to the central waveguide. Each feeder waveguide has a second refractive index and extends in a direction parallel to the central axis, and each feeder waveguide is spaced apart from the central waveguide by a distance that is based on a wavelength of the electromagnetic wave. The method includes concentrating power of the electromagnetic wave by each of the feeder waveguides, coupling the concentrated power from the feeder waveguides to the central waveguide via electromagnetic coupling, and outputting coupled concentrated power from the central waveguide via an output of the waveguide array.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 5A is a diagram illustrating a front view of a particular implementation of a waveguide array in a non-deployed configuration.

FIG. 5B is a diagram illustrating a side perspective view of the waveguide array of FIG. 5A.

FIG. 5C is a diagram illustrating a front view of the waveguide array of FIG. 5A in a partially deployed configuration.

FIG. 5D is a diagram illustrating a side perspective view of the waveguide array of FIG. 5C.

FIG. 5E is a diagram illustrating a front view of the waveguide array of FIG. 5A in a deployed configuration.

FIG. 5F is a diagram illustrating a side perspective view of the waveguide array of FIG. 5E.

FIG. 6A is a diagram illustrating a front view of another particular implementation of a waveguide array in a non-deployed configuration.

FIG. 6B is a diagram illustrating a side perspective view of the waveguide array of FIG. 6A.

FIG. 6C is a diagram illustrating a front view of the waveguide array of FIG. 6A in a partially deployed configuration.

FIG. 6D is a diagram illustrating a side perspective view of the waveguide array of FIG. 6C.

FIG. 6E is a diagram illustrating a front view of the waveguide array of FIG. 6A in a deployed configuration.

FIG. 6F is a diagram illustrating a side perspective view of the waveguide array of FIG. 6E.

FIG. 7A is a diagram illustrating a front view of another particular implementation of a device to concentrate an electromagnetic wave.

FIG. 7B is a diagram illustrating a side view of the device of FIG. 7A.

DETAILED DESCRIPTION

Figure 1:
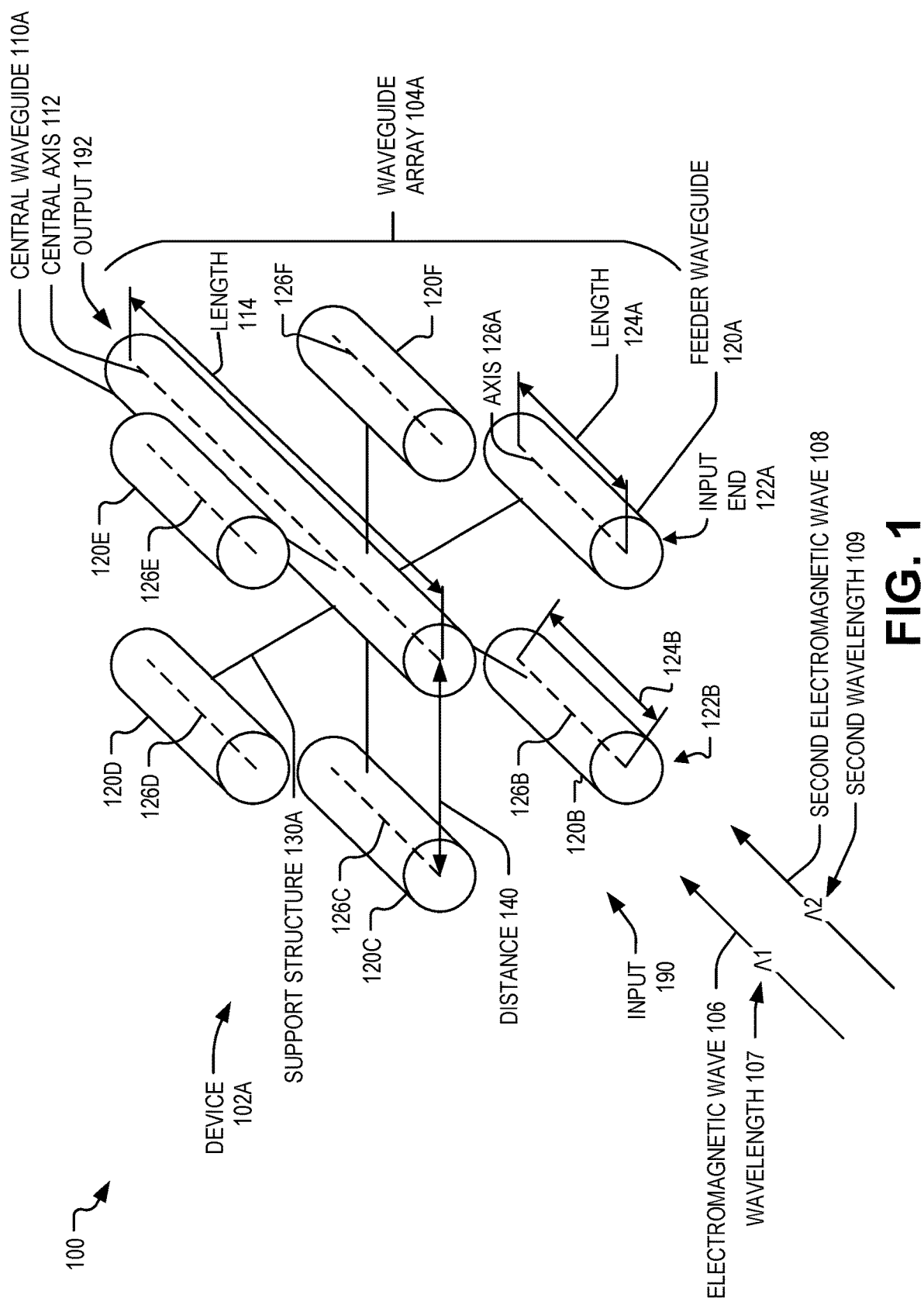
FIG. 1 is a diagram that illustrates a system including a waveguide array configured to concentrate an electromagnetic wave.

Aspects disclosed herein present systems and methods for concentrating power of an electromagnetic wave using an electromagnetic coupling "lens." Conventional lensing devices can be relatively inefficient, expensive, heavy, or a combination thereof, which limits the utility of such conventional devices for applications such as military and satellite communication systems.

As described herein, an electromagnetic coupling lens is configured to focus electromagnetic waves using one or more array of waveguides, including a central waveguide surrounded by substantially identical "feeder" waveguides spaced apart from the central waveguide, to concentrate power by coherently combining waves into a single waveguide. As an illustrative, non-limiting example, each waveguide can be an Alumina cylinder or rod having a diameter of approximately 1 millimeter (mm) and a length of approximately 135 mm, with a relative permittivity $\varepsilon_r$=9.8 and a refractive index n=3.13, and the feeder rods can be spaced 10 mm from the central rod, for focusing an electromagnetic wave with frequency f=30 gigahertz (GHz) and wavelength in a vacuum $\lambda_0$=10 mm.

The array of waveguides exhibits free-space coupling of the electromagnetic wave into the rods and concentration of the power of the electromagnetic wave into the central rod. As an example, in the arrangement described above in which the central rod is surrounded by eight feeder rods, the concentrated power output by the central rod is approximately five times the measurable power in each feeder rod.

In some implementations, the outputs of the central rods of multiple adjacent arrays of waveguides are combined for additional power concentration. In an example in which two waveguide arrays are used, the combined concentrated power output is approximately ten times the power in each feeder rod. Configurations with more than two waveguide arrays can be used to provide additional power concentration.

In some implementations, the electromagnetic coupling lens is "visible" or "opaque," e.g., strongly interacts with, electromagnetic waves of particular wavelengths and is almost "invisible" or "transparent," e.g., almost unaffected by, electromagnetic waves of other wavelengths. In the example described above, electromagnetic waves with wavelength of 10 mm are concentrated by the electromagnetic coupling lens, but electromagnetic waves with wavelength of 3 mm pass through with little to no interaction with the electromagnetic coupling lens.

The one or more arrays of waveguides of the electromagnetic coupling lens can be supported by various types of structures. In some implementations, the electromagnetic coupling lens is encased in an aerogel (e.g., a synthetic porous ultralight material), such as a silica aerogel. In other implementations, the supporting structure has a compact, expandable, and lightweight design that is particularly suitable for satellite communications. Because coupling strength, or degree of concentration, is dependent on rod spacing, use of supporting structures that enable the waveguide arrays to be expanded or collapsed enables tuning of the electromagnetic coupling lens. In one implementation, the waveguides are fixed to an inner surface of a balloon or bag that can be inflated using a gas to adjust the size of the electromagnetic coupling lens.

Adjusting the various design parameters of the electromagnetic coupling lens enables selection of particular wavelengths, such as radiofrequency waves or optical waves. To illustrate, the set of parameters including central-to-feeder waveguide distance c=10 mm, waveguide diameter d=1 mm, waveguide length L=135 mm, and refractive index n=3.13, results in an electromagnetic coupling lens tuned to concentrate a radiofrequency wave with frequency f=30 GHz and wavelength in a vacuum $\lambda_o$=10 mm, while the set of parameters c=1.50 micrometers (μm), d=0.15 L=20.3 μm, and n=3.13 results in an electromagnetic coupling lens tuned to concentrate an optical wave with f=200 terahertz (THz) and $\lambda_o$=1.5 μm.

Thus, according to various implementations, the electromagnetic coupling lens can be compact and lightweight for transport, expandable for deployment, tunable, nearly invisible to some electromagnetic waves (e.g., narrow band), and scalable across a wide range of electromagnetic wavelengths.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples illustrated in the figures and described herein are intended to aid in understanding the principles of the disclosure and are to be construed as being without limitation. To illustrate, the figures are not necessarily drawn to scale and may simplify or omit one or more components for purposes of clarity and ease of explanation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple feeder waveguides are illustrated and associated with reference numbers 120A, 120B, 120C, 120D, 120E, and 120F. When referring to a particular one of these feeder waveguides, such as a feeder waveguide 120A, the distinguishing letter "A" is used. However, when referring to any arbitrary one of these feeder waveguides or to these feeder waveguides as a group, the reference number 120 is used without a distinguishing letter. Similarly, this applies to other references, including: 102, 104, 110, 112, 122, 124, 126, 130, and 202.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining," a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 including a device 102A configured to operate as an electromagnetic coupling "lens" by concentrating an electromagnetic wave 106 received at an input 190 of the device 102A and outputting concentrated power of the electromagnetic wave 106 at an output 192 of the device 102A. The device 102A includes a waveguide array 104A that includes a central waveguide 110A and a plurality of feeder waveguides 120A, 120B, 120C, 120D, 120E, and 120F disposed around the central waveguide 110A. The central waveguide 110A has a first refractive index, and each feeder waveguide 120A, 120B, 120C, 120D, 120E, and 120F has a second refractive index. In some implementations, the first refractive index is substantially equal to the second refractive index.

The waveguide array 104A is illustrated in a "deployed" configuration in which the feeder waveguides 120A, 120B, 120C, 120D, 120E, and 120F are in a substantially symmetric arrangement (e.g., a hexagonal arrangement) with respect to the central waveguide 110A. A respective axis 126A, 126B, 126C, 126D, 126E, and 126F of each feeder waveguide 120A, 120B, 120C, 120D, 120E, and 120F is oriented substantially parallel to a central axis 112 of the central waveguide 110A, and each feeder waveguide 120A, 120B, 120C, 120D, 120E, and 120F is spaced apart from the central waveguide 110 by a distance 140. The substantially symmetric arrangement of the feeder waveguides 120A, 120B, 120C, 120D, 120E, and 120F with respect to the central waveguide 110A enables concentration of the electromagnetic wave 106 in the central waveguide 110A via electromagnetic coupling of the central waveguide 110 with each of the feeder waveguides 120A, 120B, 120C, 120D, 120E, and 120F.

Each feeder waveguide 120A, 120B, 120C, 120D, 120E, and 120F extends a length along a respective axis from its input end. For example, the feeder waveguide 120A extends a length 124A along the axis 126A from an input end 122A of the feeder waveguide 120A, and the feeder waveguide 120B extends a length 124B along the axis 126B from an input end 122B of the feeder waveguide 120B. The length 124 that each feeder waveguide 120A, 120B, 120C, 120D, 120E, and 120F extends along its respective axis 126A, 126B, 126C, 126D, 126E, and 126F is selected to inhibit coupling oscillation. In some implementations, the central waveguide 110 has a concentrator length 114 that is greater than the length that each feeder waveguide 120A, 120B, 120C, 120D, 120E, and 120F extends along its respective axis 126A, 126B, 126C, 126D, 126E, and 126F.

A support structure 130A is coupled to the waveguide array 104A and illustrated as a radial arrangement of rigid connective members. The support structure 130A is configured, in the deployed configuration, to retain the feeder waveguides 120A, 120B, 120C, 120D, 120E, and 120F in the substantially symmetric arrangement and radially separated from the central axis 112 by the distance 140. Other examples of support structure implementations are described with reference to FIG. 4, FIGS. 5A-5E, FIGS. 6A-6E, and FIGS. 7A and 7B.

In some implementations, the central waveguide 110A and each of the plurality of feeder waveguides 120A, 120B, 120C, 120D, 120E, and 120F are solid cylinder waveguides formed of alumina. In other implementations, the central waveguide 110A and each of the plurality of feeder waveguides 120A, 120B, 120C, 120D, 120E, and 120F include one or more of a dielectric material, a glass material, or a semiconductor material. In some implementations, the plurality of feeder waveguides 120A, 120B, 120C, 120D, 120E, and 120F together interact with the electromagnetic wave 106 according to an effective refractive index that is based on the second refractive index and relative positions of the feeder waveguides 120A, 120B, 120C, 120D, 120E, and 120F. In such implementations, the first refractive index can be substantially equal to the effective refractive index.

In some implementations, one or more physical parameters, such as the distance 140, is based on a particular wavelength 107 ("λ1") of the electromagnetic wave 106 to enable electromagnetic coupling between the central waveguide 110A and the feeder waveguides 120A, 120B, 120C, 120D, 120E, and 120F. In some implementations, the wavelength 107 is in a radio frequency wavelength range, in a microwave wavelength range, in a visible wavelength range, or in a near-visible wavelength range. In some implementations, one or more physical parameters, such as the distance 140, is further based on a second wavelength 109 ("λ2") of a second electromagnetic wave 108 to enable the second electromagnetic wave to pass through the device 102A without being concentrated in the central waveguide 110A.

For example, various physical values can be determined to cause the waveguide array 104A to interact with electromagnetic waves having some wavelengths, to pass through other electromagnetic waves having other wavelengths, or both. In one example the central-to-feeder waveguide distance 140 (c)=10 mm, the waveguide diameter d=1 mm, the waveguide length 124 (L)=135 mm, and the refractive index n=3.13, results in an electromagnetic coupling lens tuned to concentrate the electromagnetic wave 106 with wavelength 107 (λ1)=10 mm and to substantially not concentrate the second electromagnetic wave 108 with the second wavelength 109 (λ2)=3 mm. In another example, the central-to-feeder waveguide distance 140 (c)=1.50 µm, d=0.15 µm, L=20.3 µm, and n=3.13 results in an electromagnetic coupling lens tuned to concentrate the electromagnetic wave 106 with wavelength 107 (λ1)=1.5 µm.

Thus, the waveguide array 104A can selectively concentrate power of some electromagnetic waves and pass through other electromagnetic waves, enabling the device 102A to have relatively low detectability. In addition, because electromagnetic wave concentration is achieved using relatively small, lightweight, and inexpensive components, the device 102A can be compact and lightweight, and therefore suitable for applications such as satellite communications.

Although the device 102A is illustrated as including a single waveguide array 104A, in other implementations the device 102A has one or more waveguide arrays, such as two waveguide arrays, as described with reference to FIGS. 2A and 2B, seven waveguide arrays, as described with reference to FIGS. 3A and 3B, or any other number of waveguide arrays. Although the waveguide array 104A is illustrated as including six feeder waveguides 120, in other implementations the waveguide arrays 104A has any integer number of feeder waveguides 120 that is greater than one. For example, FIGS. 2A and 2B illustrate an implementation in which each waveguide array has eight feeder waveguides.

Figure 2A:
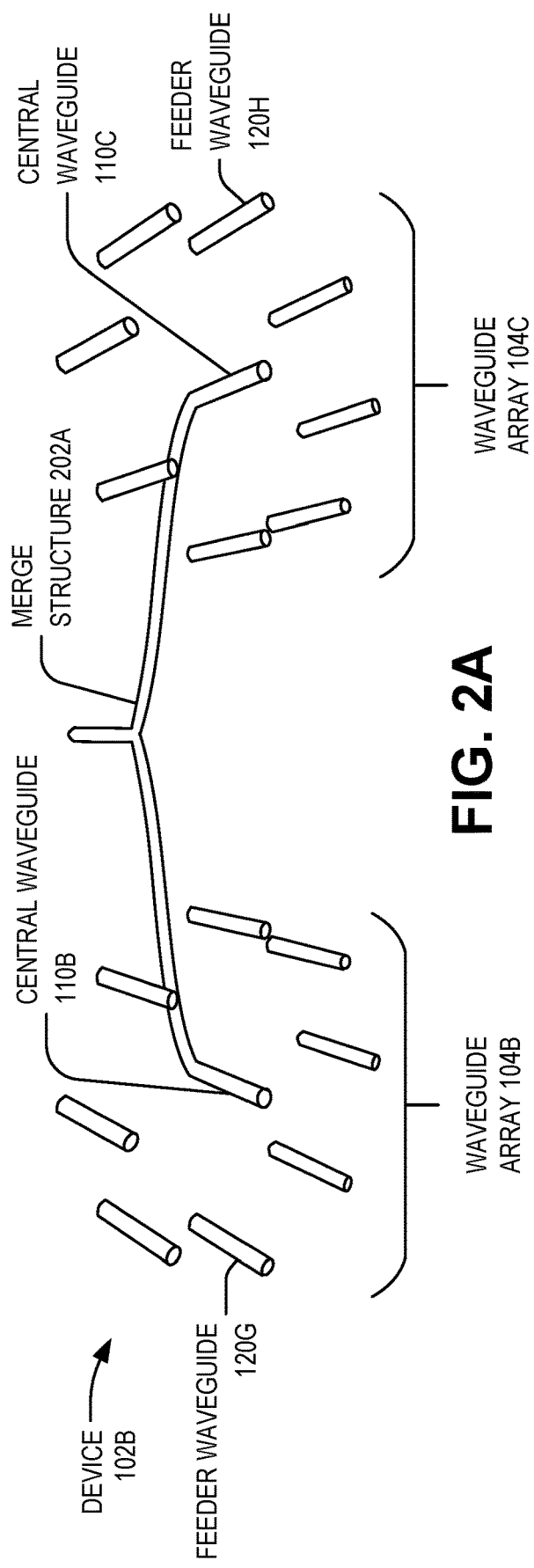
FIG. 2A is a diagram illustrating a front perspective view of a particular implementation of a device that includes multiple waveguide arrays to concentrate an electromagnetic wave.
Figure 2B:
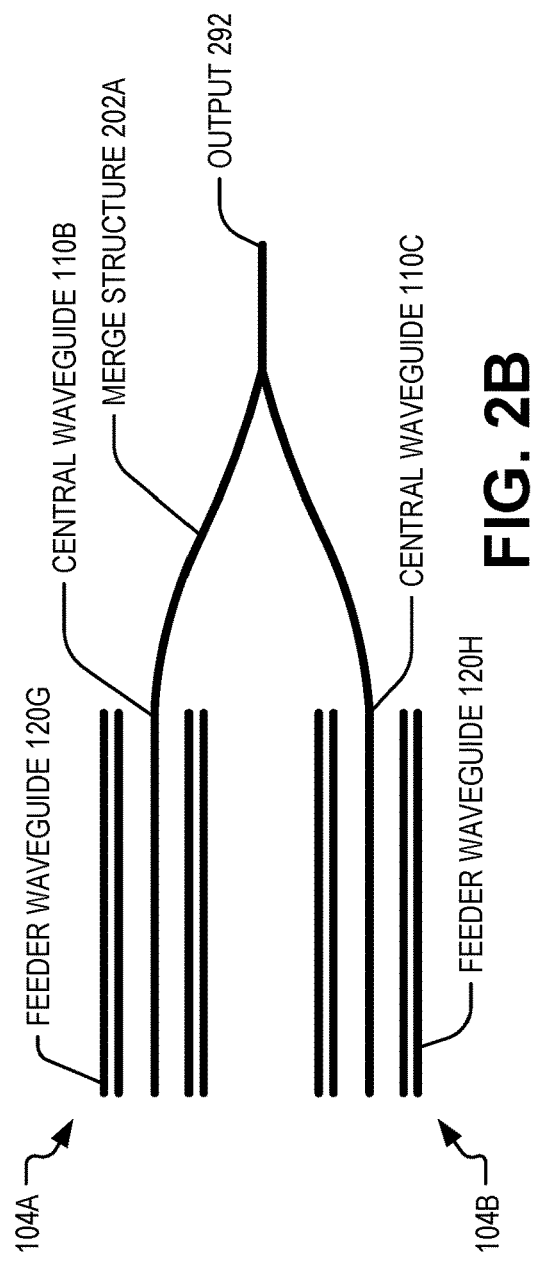
FIG. 2B is a diagram illustrating a top view of the device of FIG. 2A

FIG. 2A and FIG. 2B are diagrams illustrating a front perspective view and a top view, respectively, of a particular implementation of a device 102B that includes two waveguide arrays 104B, 104C to concentrate an electromagnetic wave. The waveguide array 104B includes a central waveguide 110B and multiple feeder waveguides, including a representative feeder waveguide 120G. The waveguide array 104C includes a central waveguide 110C and multiple feeder waveguides, including a representative feeder waveguide 120H. The central waveguide 110B is coupled to the central waveguide 110C via a merge structure 202A that is configured to combine electromagnetic waves 106 concentrated by the waveguide arrays 104B and 104C and to provide the combined concentrated electromagnetic wave at an output 292.

In some implementations, the merge structure 202A comprises a waveguide, a fiber, or a coaxial cable. In an illustrative example, the merge structure 202A is flexible. The symmetry of merge structure 202A provides phase alignment of the electromagnetic waves output from each of the central waveguides 110B and 110C. For example, each branch of the merge structure 202A can have the same length, or a difference in length between the branches can match an integer number of wavelengths (e.g., N*λ1, where n is any positive integer and where λ1 is the wavelength 107 of the electromagnetic wave 106). In other configurations in which the lengths of one or more of the branches of the merge structure 202 differ by amounts not equal to an integer multiple of the wavelength 107 of the electromagnetic wave 106, the merge structure 202 can include one or more phase delay devices to phase align the electromagnetic waves, such as described with reference to FIGS. 3A and 3B.

Combining multiple waveguide arrays increases total power concentration output by the device 102B. As an example, in the arrangement of the waveguide array 104B in which the central waveguide 110B is surrounded by eight feeder waveguides 120, the concentrated power output by the central waveguide 110B is approximately five times the measurable power in each feeder waveguide. By combining the outputs of both central waveguides 110C, the combined concentrated power provided at the output 292 is approximately twice the power of each of the central waveguides 110B, 110C and ten times the power in each feeder waveguide 120. Additional power concentration is attained in devices that include additional waveguide arrays, such as described with regard to FIGS. 3A and 3B.

Figure 3B:
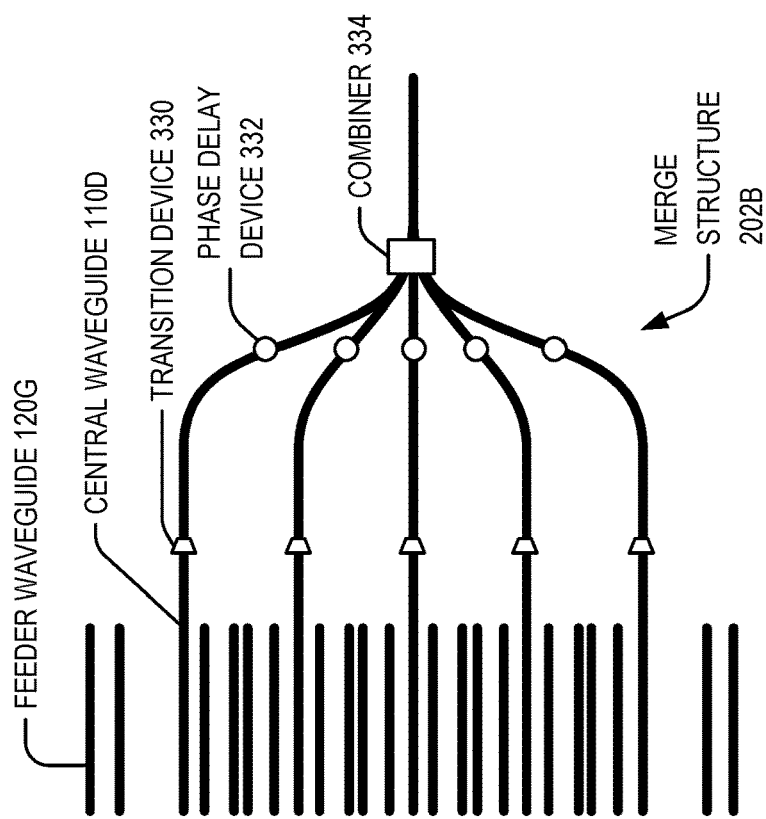
FIG. 3B is a diagram illustrating a side view of the device of FIG. 3A.
Figure 3A:
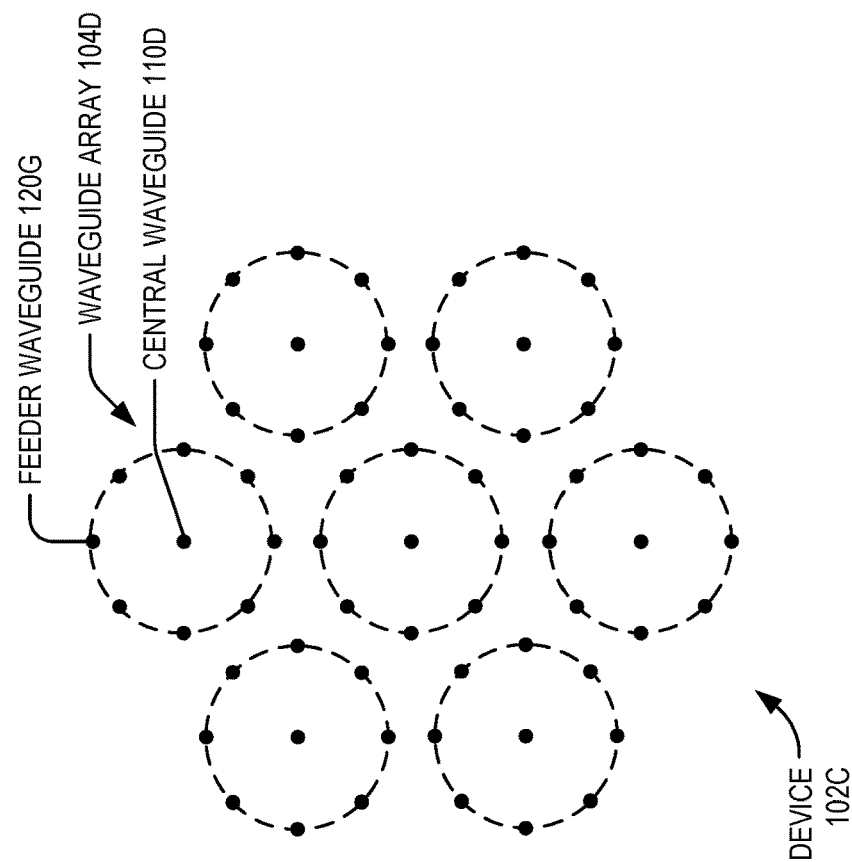
FIG. 3A is a diagram illustrating a front view of another particular implementation of a device that includes multiple waveguide arrays to concentrate an electromagnetic wave.

FIG. 3A and FIG. 3B are diagrams illustrating a front view and a side view, respectively, of a particular implementation of a device 102C that includes multiple waveguide arrays to concentrate an electromagnetic wave.

The device 102C includes seven waveguide arrays in a hexagonal configuration. The waveguide arrays are indicated by dashed circles representing array boundaries and encompassing smaller solid circles representing individual waveguides. To illustrate, a representative waveguide array 104D includes multiple feeder waveguides, such as representative feeder waveguide 120G, arranged around a central waveguide 110D. The central waveguides of each of the waveguide arrays is coupled to respective branch of a merge structure 202B via a transition device. For example, central waveguide 110D is coupled to a branch of the merge structure 202B via a representative transition device 330. In an implementation in which the merge structure 202B includes coaxial cables, the transition device 330 can include a mechanism for transitioning a radiofrequency signal into a coaxial signal, such as a dielectric-filled horn.

Each branch of the merge structure 202B includes a phase delay device, such as a representative phase delay device 332 (e.g., a radiofrequency phase shifter), to phase align the electromagnetic waves concentrated by the plurality of waveguide arrays for combination at a combiner 334, such as a coaxial combiner. The combined concentrated electromagnetic wave is provided at an output of the combiner 334.

Although each branch of the merge structure 202 includes a phase delay device in the implementation illustrated in FIGS. 3A and 3B, in other implementations one or more branches of the merge structure 202B do not include a phase delay device. For example, the signal in one branch of the merge structure 202B can function as a reference to which the phases of the signals in each of the other branches is aligned. As explained with reference to FIGS. 2A and 2B, signals travelling in branches of the merge structure 202B that have equal length or that have lengths that differ by an integer number of wavelengths are phase aligned upon reaching the combiner 334.

In general, it should be understood that each implementation of the device 102 that includes one or more waveguide arrays 104 and a merge structure 202 can include one or more transition devices (e.g., the transition device 330) to transition signals from the central waveguides 110 to the merge structure (e.g., coaxial or fiber optic), one or more phase delay devices (e.g., the phase delay device 332) to align merging waves, and one or more combiners (e.g., the combiner 334) to merge multiple waves into a single output signal.

Figure 4B:
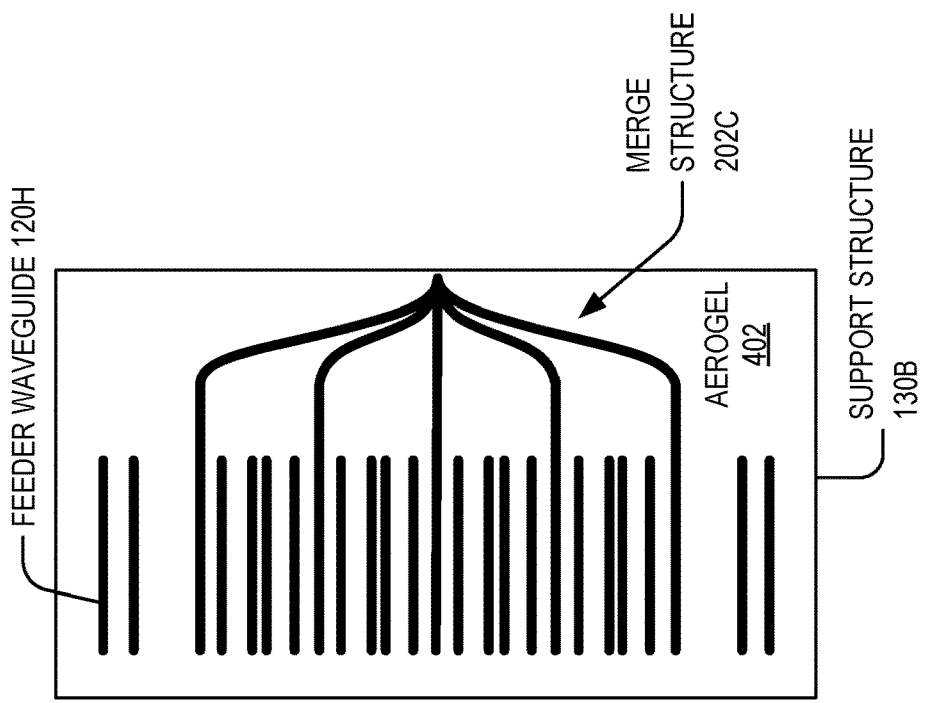
FIG. 4B is a diagram illustrating a side view of the device of FIG. 4A.
Figure 4A:
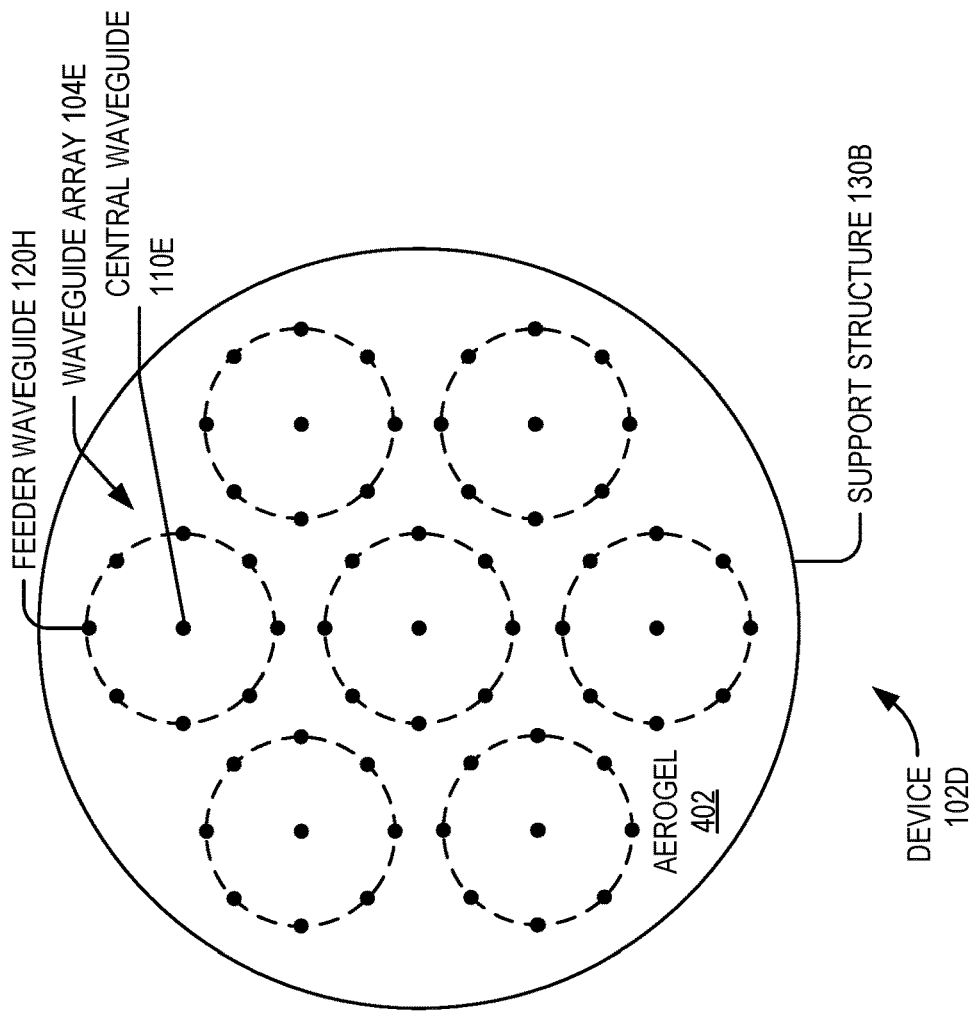
FIG. 4A is a diagram illustrating a front view of another particular implementation of a device to concentrate an electromagnetic wave.

FIG. 4A and FIG. 4B are diagrams illustrating a front view and a side view, respectively, of a particular implementation of a device 102D to concentrate an electromagnetic wave. The device 102D includes seven waveguide arrays including a representative waveguide array 104E that has multiple feeder waveguides, such as a representative feeder waveguide 120H, arranged around a central waveguide 110E. The central waveguides of each of the waveguide arrays are coupled to respective branch of a merge structure 202C.

A support structure 130B includes an aerogel 402, such as an aerogel including silica, carbon, metal oxide, organic polymer, or chalcogens, as illustrative, non-limiting examples, to maintain the waveguide arrays in the deployed configuration and to maintain the positions of the waveguide arrays and the merge structure 202C in the device 102D.

FIG. 5A and FIG. 5B are diagrams illustrating a front view and a side perspective view, respectively, of a particular implementation of a waveguide array 104F in a non-deployed configuration 500. FIG. 5C and FIG. 5D are diagrams illustrating a front view and a side perspective view, respectively, of the waveguide array 104F in a partially deployed configuration 520. FIG. 5E and FIG. 5F are diagrams illustrating a front view and a side perspective view, respectively, of the waveguide array 104F in a deployed configuration 540.

The waveguide array 104F includes a central waveguide 110F and multiple feeder waveguides, such as a representative feeder waveguide 120I. The feeder waveguides are mechanically coupled to the central waveguide 110F via a flexible support structure 130C. For example, the support structure 130C may include a spring-biased or tensioned component that is configurable to transition the device 102E between the configurations 500, 520, and 540.

In the non-deployed configuration 500, the support structure 130C is configured to enable close packing of the plurality of feeder waveguides, such as the feeder waveguide 120I, and the central waveguide 110F. In the non-deployed configuration 500, the device 102E is effectively inoperable to concentrate power of electromagnetic waves (e.g., is relatively inefficient at concentrating power of electromagnetic waves within wavelengths of interest). The support structure 130C is configured to expand the waveguide array 104F from the non-deployed configuration 500 to the partially deployed configuration 520.

In the partially deployed configuration 520, the device 102E can operate to generate a reduced concentration of power of electromagnetic waves as compared to the deployed configuration 540. From the partially deployed configuration 520, the support structure 130C can expand the waveguide array 104F to the deployed configuration 540 or contract the waveguide array 104F to the non-deployed configuration 500. For example, from the partially deployed configuration 520, the support structure 130C is configured to retract the plurality of feeder waveguides toward the central waveguide 110F to attain the non-deployed configuration 500.

In the deployed configuration 540, the feeder waveguides are spaced apart from the central waveguide 110F and, in some implementations, the support structure 130C is in tension to maintain the deployed configuration 540. From the deployed configuration 540, the support structure 130C can contract the waveguide array 104F to the partially deployed configuration 520.

FIG. 6A and FIG. 6B are diagrams illustrating a front view and a side perspective view, respectively, of a particular implementation of a waveguide array 104G in a non-deployed configuration 600. FIG. 6C and FIG. 6D are diagrams illustrating a front view and a side perspective view, respectively, of the waveguide array 104G in a partially deployed configuration 620. FIG. 6E and FIG. 6F are diagrams illustrating a front view and a side perspective view, respectively, of the waveguide array 104G in a deployed configuration 640.

The waveguide array 104G includes a central waveguide 110G and multiple feeder waveguides, such as a representative feeder waveguide 120J. The feeder waveguides are mechanically coupled to the central waveguide 110G via a flexible support structure 130D. The support structure 130D is implemented as a balloon or bag that is configured to be inflated with a fluid (such as a gas or liquid) to expand the balloon or bag, or to be deflated by removal of the fluid to contract the balloon or bag. The waveguides of the waveguide array 104G are fastened to an inner surface of the balloon or bag such that the waveguide array 104G deploys when the balloon or bag is inflated and is non-deployed when the balloon or bag is deflated.

In the non-deployed configuration 600, the support structure 130D is configured to enable close packing of the plurality of feeder waveguides, such as the feeder waveguide 120J, and the central waveguide 110G. In the non-deployed configuration 600, the device 102F is effectively inoperable to concentrate power of electromagnetic waves. The support structure 130D is configured to expand the waveguide array 104G from the non-deployed configuration 600 to the partially deployed configuration 620.

In the partially deployed configuration 620, the device 102F can operate to generate a reduced concentration of power of electromagnetic waves as compared to the deployed configuration 640. From the partially deployed configuration 620, the support structure 130D can expand the waveguide array 104G to the deployed configuration 640 or retract the plurality of feeder waveguides toward the central waveguide 110G to attain the non-deployed configuration 600.

In the deployed configuration 640, the feeder waveguides are spaced apart from the central waveguide 110G and, in some implementations, the support structure 130D is in tension to maintain the deployed configuration 640. From the deployed configuration 640, the support structure 130D can contract the waveguide array 104G to the partially deployed configuration 620.

FIG. 7A is a diagram illustrating a front view of another particular implementation of a device 102F to concentrate an electromagnetic wave, and FIG. 7B is a diagram illustrating a side view of the device 102F.

The device 102F includes a composition of matter 700 for concentrating an electromagnetic wave. The composition of matter 700 includes a rigid substrate 702, such as a fused silica or glass substrate. The substrate 702 has a plurality of waveguide regions at least partially embedded within the substrate 702. The substrate 702 functions as a support structure 130E for the waveguide regions. The waveguide regions in the composition of matter 700 are arranged in a similar manner as the feeder waveguides and central waveguides of FIGS. 3A and 3B.

In FIGS. 7A and 7B, the waveguide regions have refractive indices that are different from the substrate refractive index (i.e., the refractive index of the substrate 702). In some implementations, the waveguide regions are formed of structurally modified portions of the substrate 702, such as by application of a pulsed laser to modify the refractive index, as an illustrative, non-limiting example. In some implementations, the waveguide regions are formed of different material(s) than the substrate 702.

In some implementations, the waveguide regions are formed of doped portions of the substrate 702, such as including germanium dopants to increase the refractive index of fused silica or including fluorine dopants to decrease the refractive index of fused silica, as illustrative, non-limiting examples. In one example the substrate 702 includes a low refractive index material, and the waveguide regions correspond to doped regions of the substrate 702 that include a dopant that increases the refractive index of the low refractive index material (e.g., germanium doped ($1 \times 10^{-17}$ cm$^{-3}$) fused silica creating 8 μm diameter waveguides in bulk fused silica). In another example, the substrate 702 includes a high refractive index material, the plurality of waveguide regions 704 correspond to undoped regions of the substrate 702, and remaining portions of the substrate 702 are doped with a dopant that decreases the refractive index of the high refractive index material (e.g., undoped 8 μm diameter lines in bulk fluorine doped fused silica ($1 \times 10^{-17}$ cm$^{-3}$)).

A first set of the plurality of waveguide regions 704 (e.g., corresponding to the waveguide array 104D of FIGS. 3A and 3B) includes a central waveguide region 710 and a plurality of feeder waveguide regions 720 in a substantially symmetric arrangement with respect to the central waveguide region 710. The central waveguide region 710 has a first refractive index and a central axis 712. Each feeder waveguide region 720 has a second refractive index and is extended in a direction 714 parallel to the central axis 712 from an input end 722. Each feeder waveguide region 720 is spaced apart from the central waveguide region 710 by a distance 740 that is based on the wavelength 107 of the electromagnetic wave 106. The substrate refractive index is less than the first refractive index and is less than the second refractive index.

A merge structure 202C is coupled to each of the central waveguide regions via a respective transition device, such as a transition device 730 coupled to the central waveguide region 710. In one example, the transition device 730 corresponds to a dielectric-filled horn. One or more branches of the merge structure 202C can include a respective phase array device, such as a phase arrays device 732 (e.g., a static or active phase delay device), to align respective concentrated waves for combination at a combiner 734.

Figure 8:
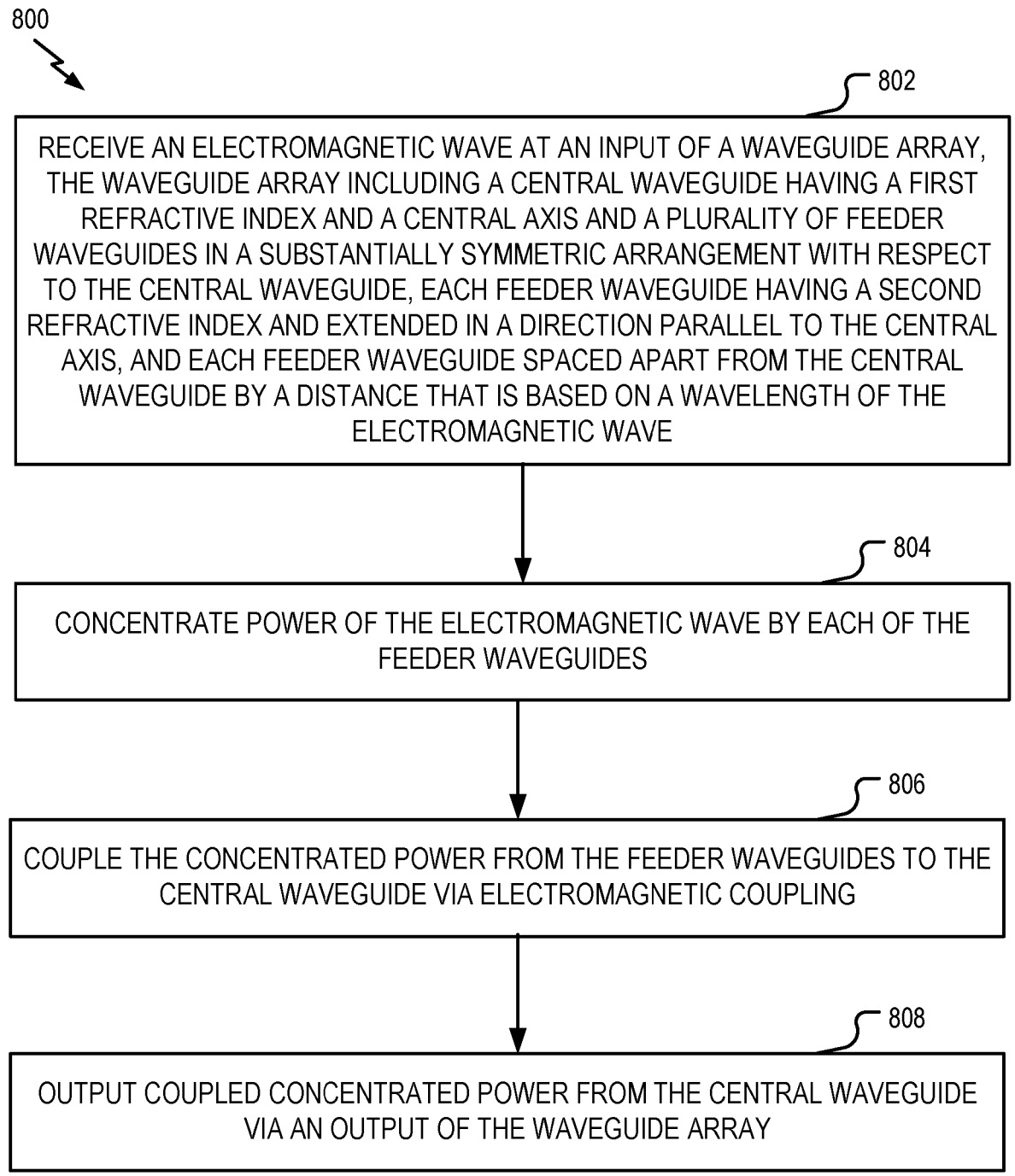
FIG. 8 is a flow diagram that illustrates an example of method of concentrating an electromagnetic wave.

FIG. 8 is a flow diagram that illustrates an example of method 800 of concentrating an electromagnetic wave. The method 800 can be performed at one or more waveguide arrays or at one or more devices that include one or more waveguide arrays, such as described with reference to any of FIGS. 1-7B.

The method 800 includes, at block 802, receiving an electromagnetic wave at an input of a waveguide array. For example, the electromagnetic wave 106 of FIG. 1 is received at the input 190 of the waveguide array 104A. The waveguide array incudes a central waveguide having a first refractive index and a central axis, such as the central waveguide 110A of FIG. 1 having the first refractive index and the central axis 112. The waveguide array also includes a plurality of feeder waveguides in a substantially symmetric arrangement with respect to the central waveguide, each feeder waveguide having a second refractive index and extended in a direction parallel to the central axis, and each feeder waveguide spaced apart from the central waveguide by a distance that is based on a wavelength of the electromagnetic wave. For example, the waveguide array 104A of FIG. 1 includes the feeder waveguides 120A, 120B, 120, 120D, 120E, and 120F in a substantially symmetric arrangement with respect to the central waveguide 110A. Each of the feeder waveguide 120A, 120B, 120, 120D, 120E, and 120F has a second refractive index and extends in a direction parallel to the central axis 112, and each of the feeder waveguides 120A, 120B, 120, 120D, 120E, and 120F is spaced apart from the central waveguide 110A by the distance 140, which is based on the wavelength 107 of the electromagnetic wave 106.

The method 800 includes, at block 804, concentrating power of the electromagnetic wave by each of the feeder waveguides and, at block 806, coupling the concentrated power from the feeder waveguides to the central waveguide via electromagnetic coupling. For example, the feeder waveguides 120A, 120B, 120, 120D, 120E, and 120F of the waveguide array 104A of FIG. 1 concentrate power of the electromagnetic wave 106 and couple the concentrated power to the central waveguide 110A via electromagnetic coupling.

The method 800 includes, at block 808, outputting coupled concentrated power from the central waveguide via an output of the waveguide array. For example, the waveguide array 104A of FIG. 1 outputs the coupled concentrated power of the electromagnetic wave 106 at the output 192 of the central waveguide 110A.

Figure 9:
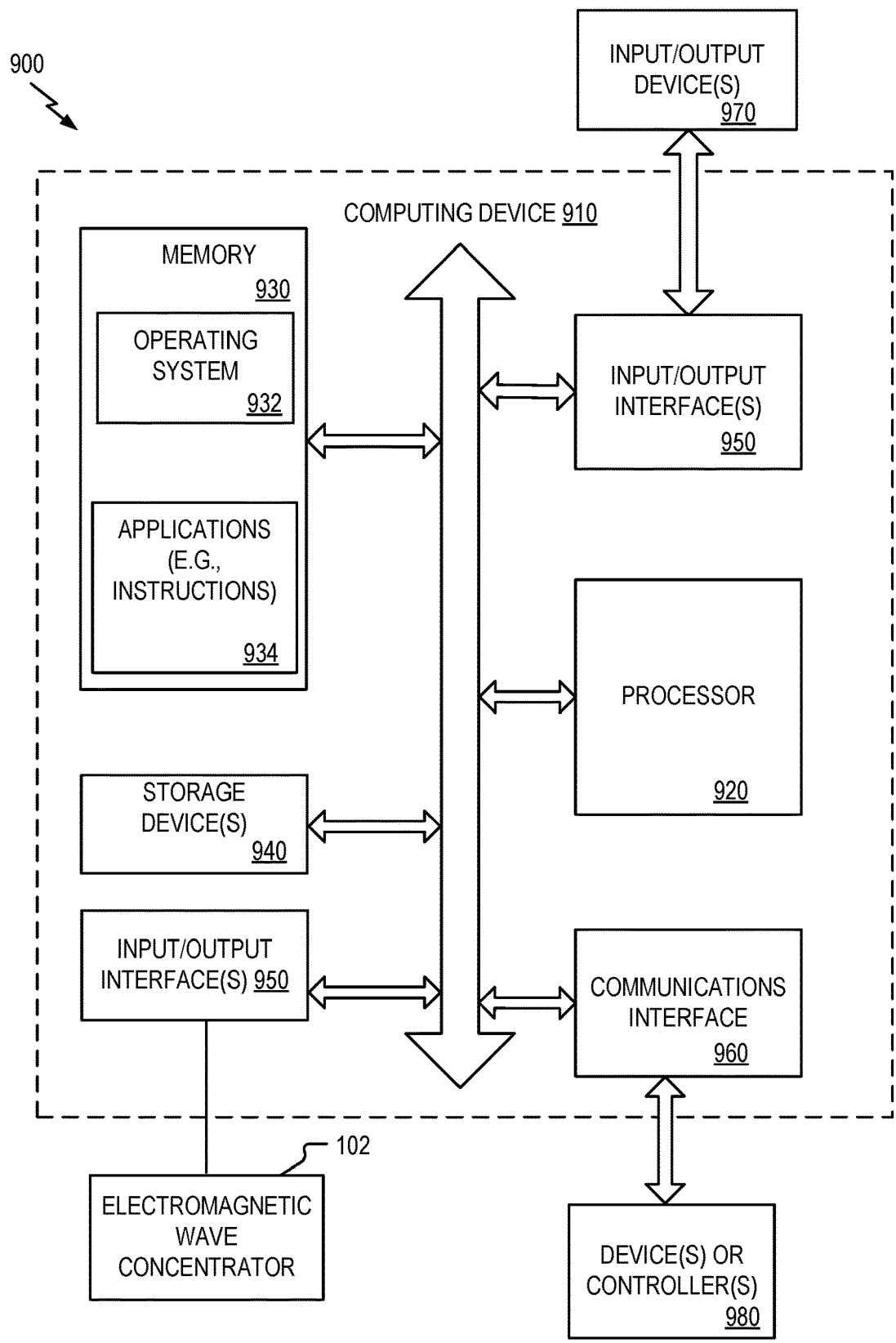
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8.

The computing device 910 includes one or more processors 920. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data. In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 and to receive concentrated power from an electromagnetic wave concentrator, such as any of the devices 102 of FIG. 1-7B. The processor(s) 920 are configured to communicate with devices or controllers 980 via the one or more communications interfaces 960. For example, the one or more communications interfaces 960 can include a network interface.

In conjunction with the described systems and methods, an apparatus for concentrating an electromagnetic wave is disclosed that includes means for guiding a wave along a central axis, the means for guiding the wave along the central axis having a first refractive index. In some implementations, the means for guiding the wave along the central axis corresponds to the central waveguide 110 of any of FIG. 1, FIG. 2A-2B, FIG. 3A-3B, FIGS. 4A-4B, FIGS. 5A-5F, or FIGS. 6A-6F, the central waveguide region 710, one or more other materials or devices configured to guide an electromagnetic wave along a central axis, or a combination thereof.

The apparatus also includes means for guiding the wave along multiple axes disposed around the central axis and extending substantially parallel to the central axis, the means for guiding the wave along the along multiple axes having a second refractive index. In some implementations, the means for guiding the wave along multiple axes corresponds to the feeder waveguides 120 of any of FIG. 1, FIG. 2A-2B, FIG. 3A-3B, FIGS. 4A-4B, FIGS. 5A-5F, or FIGS. 6A-6F, the feeder waveguide regions 720A and 720B of FIG. 7A-7B, one or more other materials or devices configured to guide an electromagnetic wave along a multiple axes around the central axis, or a combination thereof.

The apparatus includes means for retaining the means for guiding the wave along multiple axes, in a deployed configuration, in a substantially symmetric arrangement with respect to the means for guiding a wave along the central axis to enable concentration of an electromagnetic wave of a particular wavelength in the means for guiding a wave along the central axis via electromagnetic coupling of the means for guiding a wave along the central axis with the means for guiding the wave along multiple axes, with each of the multiple axes spaced apart from the central axis by a distance that is based on the particular wavelength. In some implementations, the means for retaining the means for guiding the wave along multiple axes corresponds to the support structure 130 of any of FIG. 1, FIGS. 4A-4B, FIGS. 5A-5F, FIGS. 6A-6F, or FIG. 7A-7B, the aerogel 402, the rigid substrate 702, one or more other materials or devices configured to retain the means for guiding the wave along multiple axes, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for concentrating an electromagnetic wave, the device comprising:
   one or more waveguide arrays, a particular waveguide array of the one or more waveguide arrays comprising:
      a central waveguide having a first refractive index and a central axis; and
      a plurality of feeder waveguides disposed around the central waveguide, each feeder waveguide having a second refractive index and an input end, and each feeder waveguide extending a length along a respective axis from the input end; and
   a support structure coupled to the one or more waveguide arrays and configured to, in a deployed configuration, retain the plurality of feeder waveguides of the particular waveguide array in a substantially symmetric arrangement with respect to the central waveguide to enable concentration of an electromagnetic wave of a particular wavelength in the central waveguide via electromagnetic coupling of the central waveguide with each of the feeder waveguides, with the respective axis of each feeder waveguide oriented substantially parallel to the central axis of the central waveguide and with each feeder waveguide spaced apart from the central waveguide by a distance that is based on the particular wavelength.

2. The device of claim 1, wherein the central waveguide has a concentrator length, and wherein the concentrator length is greater than the length that each feeder waveguide extends along the respective axis from the input end.

3. The device of claim 2, wherein the length that each feeder waveguide extends along the respective axis from the input end is selected to inhibit coupling oscillation.

4. The device of claim 2, wherein the one or more waveguide arrays include a plurality of waveguide arrays, and further comprising a merge structure to combine electromagnetic waves concentrated by the plurality of waveguide arrays, wherein the central waveguide of the particular waveguide array is coupled to a central waveguide of another waveguide array of the plurality of waveguide arrays via the merge structure.

5. The device of claim 4, wherein the merge structure comprises a waveguide, a fiber, or a coaxial cable.

6. The device of claim 4, wherein the merge structure comprises a phase delay device to phase align the electromagnetic waves concentrated by the plurality of waveguide arrays.

7. The device of claim 4, wherein the merge structure is flexible.

8. The device of claim 1, wherein the support structure comprises an aerogel.

9. The device of claim 1, wherein the support structure is flexible and is in tension in the deployed configuration.

10. The device of claim 9, wherein the support structure is further configured to, in a non-deployed configuration, enable close packing of the plurality of feeder waveguides and the central waveguide.

11. The device of claim 9, wherein the support structure is further configured to retract the plurality of feeder waveguides toward the central waveguide to attain a non-deployed configuration.

12. The device of claim 1, wherein the distance is further based on a second wavelength of a second electromagnetic wave to enable the second electromagnetic wave to pass through the device without being concentrated in the central waveguide.

13. The device of claim 1, wherein the particular wavelength is in a radio frequency wavelength range, in a microwave wavelength range, in a visible wavelength range, or in a near-visible wavelength range.

14. The device claim 1, wherein the central waveguide and each of the plurality of feeder waveguides comprise one or more of a dielectric material, a glass material, or a semiconductor material.

15. The device of claim 1, wherein the first refractive index is substantially equal to the second refractive index.

16. The device of claim 1, wherein the plurality of feeder waveguides together interact with the electromagnetic wave according to an effective refractive index that is based on the second refractive index and relative positions of the feeder waveguides, and wherein the first refractive index is substantially equal to the effective refractive index.

17. A composition of matter for concentrating an electromagnetic wave, the composition of matter comprising:
   a rigid substrate having a substrate refractive index;
   a plurality of waveguide regions at least partially embedded within the rigid substrate, a first set of the plurality of waveguide regions comprising:
      a central waveguide region having a first refractive index and a central axis; and
      a plurality of feeder waveguide regions in a substantially symmetric arrangement with respect to the central waveguide region, each feeder waveguide region having a second refractive index and extended in a direction parallel to the central axis from an input end, and each feeder waveguide region spaced apart from the central waveguide region by a distance that is based on a wavelength of the electromagnetic wave, wherein the substrate refractive index is less than the first refractive index and is less than the second refractive index.

18. The composition of matter of claim 17, wherein the rigid substrate comprises a low refractive index material and the plurality of waveguide regions correspond to doped regions of the rigid substrate, wherein the doped regions comprise a dopant that increases the refractive index of the low refractive index material.

19. The composition of matter of claim 17, wherein the rigid substrate comprising a high refractive index material, wherein the plurality of waveguide regions correspond to undoped regions of the rigid substrate, and wherein remaining portions of the rigid substrate are doped with a dopant that decreases the refractive index of the high refractive index material.

20. A method comprising:
   receiving an electromagnetic wave at an input of a waveguide array, the waveguide array comprising:
      a central waveguide having a first refractive index and a central axis; and
      a plurality of feeder waveguides in a substantially symmetric arrangement with respect to the central waveguide, each feeder waveguide having a second refractive index and extended in a direction parallel to the central axis, and each feeder waveguide spaced apart from the central waveguide by a distance that is based on a wavelength of the electromagnetic wave;
   concentrating power of the electromagnetic wave by each of the feeder waveguides;
   coupling the concentrated power from the feeder waveguides to the central waveguide via electromagnetic coupling; and
   outputting coupled concentrated power from the central waveguide via an output of the waveguide array.

* * * * *